United States Patent [19]

Rockar et al.

[11] 4,174,241
[45] Nov. 13, 1979

[54] SIMULTANEOUSLY LAMINATING AND PRESS POLISHING PLASTIC LAMINATED TRANSPARENCIES

[75] Inventors: Paul A. Rockar, Cabot; Melvin K. Law; Thomas W. Hawk, both of New Kensington, all of Pa.

[73] Assignee: PPG Industries, Inc., Pittsburgh, Pa.

[21] Appl. No.: 926,685

[22] Filed: Jul. 21, 1978

[51] Int. Cl.² .............................................. B32B 31/20
[52] U.S. Cl. ........................... 156/102; 156/103; 156/104; 156/105; 156/106; 156/107; 156/219; 156/285; 156/286; 156/289; 156/382; 156/581; 264/102; 264/571; 428/388; 428/504
[58] Field of Search ................................ 156/102–107, 156/286, 382, 580, 581, 583, 285, 499, 219, 289; 100/269 A, 269 R; 264/102, 571; 425/388, 389, 504

[56] References Cited

U.S. PATENT DOCUMENTS

| 1,725,454 | 8/1929 | Heyl | 156/104 |
|---|---|---|---|
| 1,909,444 | 5/1933 | Worrall | 156/104 |
| 1,959,221 | 3/1934 | Sherts | 156/104 |
| 2,306,314 | 12/1942 | Lardin | 156/104 |
| 2,466,078 | 4/1949 | Boicey | 156/104 |
| 2,713,378 | 7/1955 | Nadler et al. | 156/580 |
| 2,783,176 | 2/1957 | Boicey | 156/102 |
| 3,038,825 | 6/1962 | Little | 156/104 |
| 3,073,268 | 1/1963 | Cole | 156/285 |
| 3,478,485 | 11/1969 | Hechenleitner | 156/583 |
| 3,912,542 | 10/1975 | Hirano et al. | 156/104 |
| 3,996,091 | 12/1976 | Daunt et al. | 156/285 |
| 4,040,888 | 8/1977 | Soska et al. | 156/104 |

FOREIGN PATENT DOCUMENTS 204166 10/1956 Australia .................. 156/104

Primary Examiner—Jerome W. Massie
Attorney, Agent, or Firm—Edward I. Mates

[57] ABSTRACT

The present invention relates to simultaneous press polishing and lamination of laminated plastic transparencies such as are used in aircraft as aircraft windshields or aircraft canopies. The present invention is especially useful to minimize deviations from surface smoothness of the all plastic laminates due to the entrapment of air that form air pockets within a flexible evacuating bag within which an assembly to be press polished and laminated is inserted during its fabrication.

10 Claims, 8 Drawing Figures

U.S. Patent  Nov. 13, 1979  Sheet 1 of 2  4,174,241
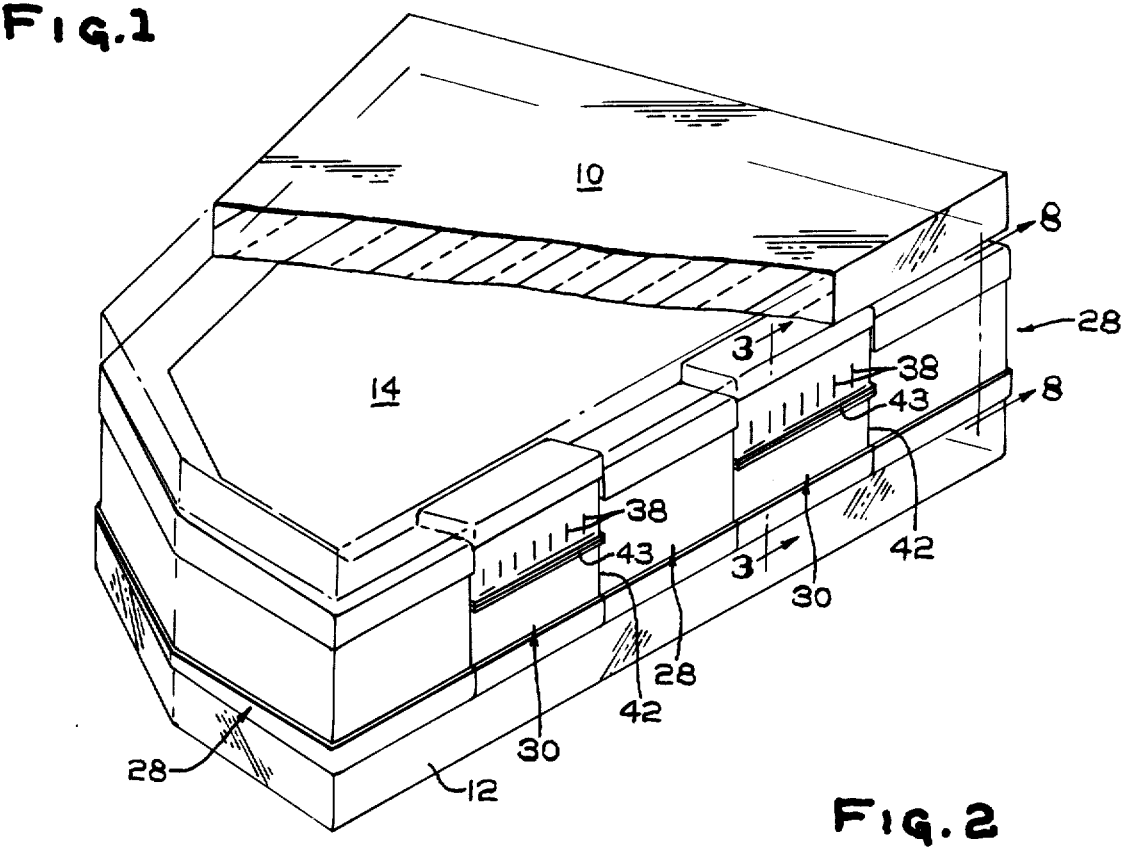
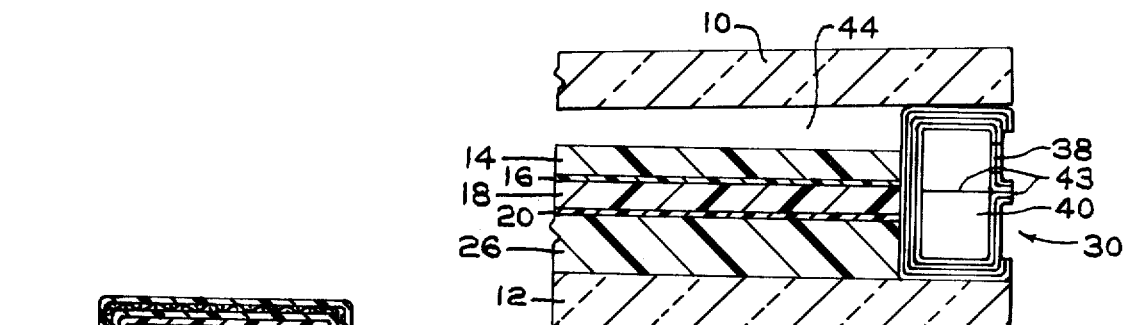
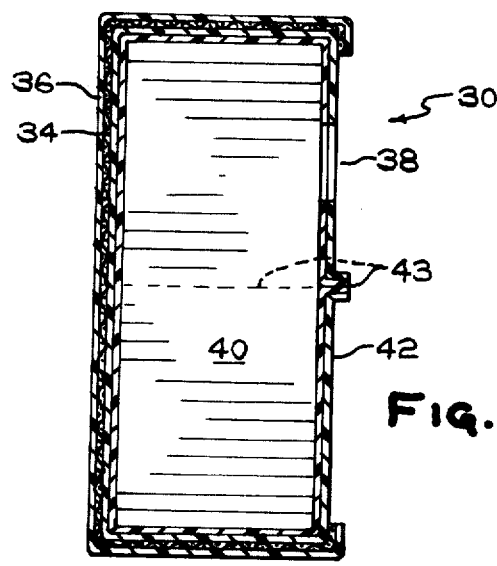
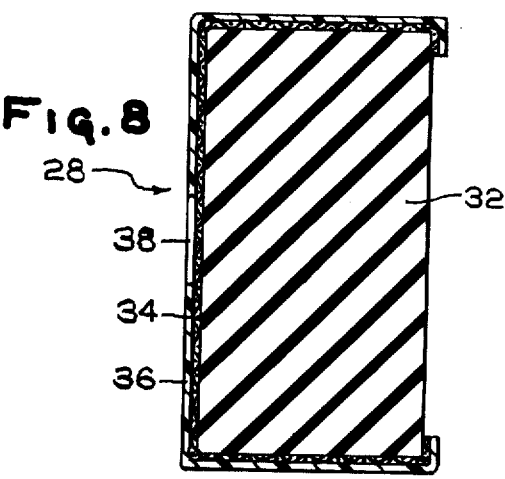

SIMULTANEOUSLY LAMINATING AND PRESS POLISHING PLASTIC LAMINATED TRANSPARENCIES

BACKGROUND OF THE INVENTION

1. Field of the Invention

The present invention relates to aircraft transparencies, and more particularly, to laminated aircraft transparencies. In the desire to minimize the weight of laminated windows used in aircraft while retaining the penetration resistance of laminated safety glass, various hard plastic materials, such as acrylic plastics, particularly polymethylmethacrylate, and polycarbonates, have been laminated together using various interlayer materials to provide laminated transparencies that have good optical properties and good resistance to impact when a bird collides with the transparency while the aircraft is flying at a high speed.

In fabricating laminated transparencies for aircraft, alternate sheets of relatively rigid plastic, such as acrylic plastic or polycarbonate plastic, are assembled with layers of interlayer material, such as polyurethanes or silicones or plasticized polyvinyl acetals, such as polyvinyl butyral. The assembly is placed within a flexible laminating bag with a pair of pressing plates applied to the outside major surfaces of the assembly to be laminated. The flexible evacuating bag is evacuated and sealed. The bag and its contents are exposed to elevated temperatures and pressures in an autoclave and after such exposure, the flexible bag is cut open and its contents removed. The pressing plates, preferably of chemically tempered glass sheets, are separated from the remainder of the assembly which became laminated.

In the past, the laminating art has had difficulty in avoiding deviations from surface smoothness in the assemblies that were laminated in such a manner. Not only did the major outer surfaces of the assemblies continue to retain surface irregularities, such as small pits or departures from the desired curvature, but also there were small areas of optical distortion which are believed to result from air pockets that remain between the plies of the laminated assembly due to insufficient evacuation of the flexible evacuating bag during the step prior to the final combination press polishing and laminating step.

2. Description of the Prior Art

U.S. Pat. No. 1,725,454 to Heyl discloses a technique for making laminated safety glass comprising adherent sheets of glass and cellulose derivative composition, such as cellulose acetate, in which bubbles of air become trapped between the sheets of the assembly and impair the finished product. This patent requires that the cellulose acetate sheets be moistened to improve their adhesion to glass. To avoid residual air in a closed bag being drawn in between the sheets while the liquid is pressed out by external atmospheric pressure on the bag as the bag is evacuated, liquid is introduced into the bag from the bottom and suction is applied to the top of the bag and the bag and its contents are supported in a vertical orientation during the application of water and the evacuation step.

U.S. Pat. No. 1,909,444 to Worrall applies a frame of non-compressible strips arranged around the perimeter of an assembly of glass and interlayer material to be laminated within a flexible evacuating and laminating bag to prevent excessive pressure upon the edges of the glass.

U.S. Pat. No. 1,959,221 to Sherts applies a pair of wood members provided at their inner edges with wedges. The wedges serve to keep glass plates separated while air is exhausted from a bag containing alternate layers of glass and interlayer material. An operator grasps the wedge members and stretches the rubber bag to retract the wedges so that the sheets come into engagement by gravity and by pressure of the air on the exterior of the bag so that the bag in which the assembly to be laminated is maintained during the application of heat and pressure is in intimate contact and the bag is fully evacuated, thereby eliminating the presence of air bubbles within the bag.

U.S. Pat. No. 2,466,078 to Boicey discloses means for evacuating and sealing a thin flexible bag used to support an assembly of glass and plastic having an extended plastic border.

U.S. Pat. No. 2,783,176 to Boicey discloses a method of laminating acrylic resin to polyvinyl butyral by placing an assembly of layers of acrylic resin and polyvinyl butyral in a bag, exhausting air from the bag, and exposing the bag and its contents to hot water to effect a lamination of the acrylic plastic to the polyvinyl butyral and then hanging the laminate so formed in an oven kept at elevated temperatures to remove wrinkles from the laminate.

U.S. Pat. No. 3,038,825 to Little discloses a flexible bag for laminating glass-plastic assemblies which incorporates rope mounted about three sides of the interior of a bag in which the assembly is laminated. The rope provides an air conduit that prevents complete collapse of the bag top and bottom walls when the bag interior is subjected to vacuum. This feature is alleged to improve the efficiency of evacuation of the laminating bag.

U.S. Pat. No. 3,912,542 to Hirano et al proposes to minimize the presence of air within an assembly to be laminated by interposing an adhesive powdery thermoplastic composition or an air-permeable sintered product thereof between at least two sheet-like materials to form an assembly, maintaining the assembly at reduced pressure within a laminating bag to deaerate the adhesive layer, and heating the assembly while maintaining it at reduced pressure at least at the initial stage of heating to melt the powdery thermoplastic resin composition or the sintered product and bond the sheet-like materials to provide an integral body.

SUMMARY OF THE INVENTION

The present invention provides a method of fabricating a laminated transparency having smooth outer major surfaces and provided with a minimum of entrapped air bubbles. The method according to the present invention comprises assembling alternate layers of a relatively hard plastic selected from the group of hard transparent plastic materials consisting of acrylic plastics, polycarbonates, polyesters, ionomers and hard polyurethanes, alternating with relatively soft layers of interlayer material selected from the group consisting of polyurethanes, silicones, and plasticized polyvinyl acetals. These layers form an assembly to be laminated. When the outer surface of the assembly has surface irregularities, the latter are simultaneously press polished according to the present invention.

The assembly to be laminated and simultaneously press polished that comprises the alternate layers of relatively hard and relatively soft plastic is enclosed between a pair of pressing plates having a greater extent than the outline of the assembly. The resulting assembly of pressing plates and assembly to be laminated is so arranged that the pressing plates extend beyond the margins of the assembly to be laminated to form a channel-shaped perimeter. Parting material is applied to the channel-shaped perimeter and a marginal frame having a thickness approximating the total thickness of the layers of the assembly to be laminated is applied between the extending portions of the pressing plates along at least two adjacent sides of the channel-shaped perimeter and between the extending portions of said pressing plates along at least a portion of the length of the remaining one or two adjacent sides of the channel-shaped perimeter. The remainder of the extending portions of the pressing plates are separated by wedge means having a thickness greater than the total thickness of the assembly to be laminated. The wedge means is composed of material softer than the relatively hard plastic. Preferably the same material as the interlayer material is used. The wedge means forms a wedge-shaped space between one of the pressing plates and an outer major surface of one of the layers of the assembly to be laminated that faces said one of said pressing plates. The assembly and the pressing plates are inserted while at that relative relation to one another in a thin, flexible laminating bag. The bag is evacuated and sealed and the sealed evacuated bag is exposed to an elevated pressure and temperature for sufficient time for the pressing plates to smooth any irregularities in the outer major surfaces of the assembly to be laminated by press polishing, to distort the wedge means until the thickness thereof approximates the total thickness of the assembly and to laminate the layers of the assembly. The bag is opened, the pressing plates and the assembly are removed from the bag and the pressing plates are separated from the assembly to provide a finished laminated transparency suitable for use in aircraft.

Different configurations of thicknesses and number of laminations are needed for different aircraft parts, as will be learned from a study of a description of a specific embodiment that follows.

A typical example of a suitable acrylic resin is polymethyl methacrylate. Acrylics available commercially from Rohm and Haas under the designations "PLEXIGLAS II" and "PLEXIGLAS 55" are described in U.S. Pat. No. 3,310,458 to Mattimoe and Hofmann.

Other relatively rigid plastic materials include polycarbonates, such as those of a material akin to that disclosed in U.S. Pat. Nos. 3,117,019 to Cohnen and Klockgether and 4,081,581 to Harry E. Littell, Jr. Preferably, the polycarbonate material contemplated is one of the polycarbonate resins commercially available under the trademarks "LEXAN" and "MERLON" from General Electric Company and Mobay Chemical Company, respectively.

Still other materials suitable for use as the hard plastic components are polyesters derived from dibasic acids and dihydric alcohols. Hard optically clear polyurethane compositions, such as transparent sheets of cured polyurethane prepared from a cycloaliphatic polyisocyanate, low molecular weight active hydrogen-containing material and optionally a polycarbonate diol where the weight percentage of the urethane moieties and the cross-length density are carefully controlled so as to provide a proper balance of physical properties, particularly between hardness, flexibility and heat distortion temperatures are also suitable. The latter are disclosed in U.S. Pat. No. 4,101,529 of Vernon G. Ammons.

Interlayer materials that are laminated include polyurethanes, such as polyester urethanes having superior properties for use in safety glass windshields formed from a hydroxy-terminated polyester of polycaprolactone, poly(butylene adipate), poly(butylene azelate) or mixtures; a diol having a molecular weight less than 250, preferably 1,4-butane diol or 1,3-butane diol, and a cycloaliphatic diisocyanate, such as disclosed in U.S. Pat. No. 3,931,113 to Seeger and Kaman. Other polyurethanes preferably used for the interlayers can broadly be described as the reaction product of a polyisocyanate and a polyol which upon lamination forms a transparent interlayer. The polyurethanes may have thermosetting or thermoplastic properties, but preferably exhibit thermoplastic properties. Thus, for example, an organic diisocyanate is reacted with a relatively long chain diol and a curing agent which is usually a monomeric compound having at least two active hydrogens per molecule, as determined by the Zerewitinoff test described in Kohler, J. Am. Chem. Soc., 49, 3181 (1927). Suitable polyisocyanates are organic diisocyanates which include aromatic, aliphatic, cycloaliphatic, and heterocyclic diisocyanates. Examples are 2,4- and 2,6-tolylene diisocyanate, 1,4- butane diisocyanate, 1,2-isocyanatomethylcyclobutane, 4,4'-methylene-bis-(cyclohexyl isocyanate)1,10-decane diisocyanate, and furylidene diisocyanate.

Suitable long chain diols include polyester diols. The polyester diols can be prepared by the polyesterification reaction of an aliphatic dibasic acid or an anhydride thereof with a diol, preferably an aliphatic diol. Suitable aliphatic dicarboxylic acids can be represented by the formula HOOC—R—COOH wherein R is an alkylene radical containing from 2 to 12, and preferably 4 to 8, carbon atoms inclusive, examples of which are adipic, succinic, palmitic, suberic, azelaic and sebacic moieties. Suitable aliphatic diols contain from 2 to 15 carbon atoms, exemplary of which are ethylene glycol, 1,3-propanediol, 1,4-butanediol and 1,6-hexanediol. The average molecular weight of the polyester diol should be between 750 and 5000, preferably between 1000 and 3300. The preferred polyester diol is poly(1,4-butylene adipate) having a molecular weight of about 1800 to 2200.

With the thermoplastic polyurethanes the polyisocyanate and the long chain glycol are preferably reacted with a curing agent which has two active hydrogens per molecule. Preferred curing agents are aliphatic diols having from 2 to 15 carbon atoms such as ethylene glycol, 1,3-propane diol, 1,4-butanediol and 1,6-hexanediol. Aminoalcohols and diamines can also be employed. Examples include monoethanolamine and 1,2-ethanediamine.

The thermoplastic polyurethanes can be prepared by prereacting the organic diisocyanate (about 4 molar parts) with the mixture of diols (about 1 molar part long chain diol and 2.8 molar parts curing agent) for about 15 minutes at a temperature of from about 100° to about 120° C. and then cooling the reaction mixture to a temperature below about 30° C. in order to interrupt the reaction and produce a thermoplastic product which has free isocyanate groups. The plastic can then be extruded into film or thicker sheet form and thinner films of the required thickness skived from the sheets.

Silicones are also useful for use as interlayers in material to be laminated for use as aircraft transparencies. A suitable silicone interlayer material is "SYLGARD 184" sold by Dow Corning.

Ionomers may also be used as interlayers in laminated all-plastic aircraft transparencies. These ionomers are based on ethylene. Suitable interlayer materials include "SURLYN A", sold by E. I. duPont de Nemours and "POLY-EM 500", sold by Gulf Oil Corporation.

As a substitute for polyurethanes or silicones or ionomers, the interlayer material may be composed of a polyvinyl acetal, such as plasticized polyvinyl butyral resin. Plasticized polyvinyl acetal resins have the required transparency, tensile strength and flexibility also found in polyurethane resins. Polyvinyl butyral is prepared as recited in U.S. Pat. No. 2,400,957 to Stamatoff, and is commonly used as the interlayer of laminated glass windshields in automobiles because of its adhesion to glass when subjected to suitable temperatures and pressures, because it is transparent when bonded between two sheets of glass or plastic substitutes for glass, such as the rigid plastic ingredient described previously, and because of its resistance to elongation whenever an object impacts upon a laminated safety glass window, such as the multi-layer laminates used in aircraft transparencies.

The polyvinyl acetal resins may be made from various unsubstituted aldehydes or mixtures thereof or even from unsubstituted ketones containing an active carbonyl group or from mixtures of unsubstituted aldehydes and ketones. Thus, formaldehyde, acetaldehyde, propionaldehyde, butyraldehyde, valeraldehyde, hexaldehyde, benzaldehyde, crotonaldehyde, cyclohexanone and the like and mixtures thereof may be used. In general, the acetal resin is made by reacting an aldehyde with hydrolyzed polyvinyl ester in the presence of a solvent with a product and precipitating the resin product with water. Alternate methods might include carrying out the reaction in the presence of a nonsolvent dispersing medium such as water or a non-solvent mixture of water and solvent, for example, a water-ethanol mixture. In general, polyvinyl acetal resins made from saturated or unsubstituted aliphatic aldehydes are the most suitable. These would include polyvinyl acetal resins made from unsubstituted saturated aliphatic aldehydes containing less than six carbon atoms and especially those made from formaldehyde, acetaldehyde, butyraldehyde, and mixtures thereof. Particularly, preferred are polyvinyl acetal resins made from butyraldehyde, the so-called polyvinyl butyral. The preferred molecular weight range is from 150,000 to 250,000. The polyvinyl acetal resins may be considered to be made up on a weight basis of from 5 to 25 percent hydroxyl groups, calculated as polyvinyl alcohol, 0 to 40 percent acetate groups, calculated as polyvinyl acetate and the balance being essentially acetal. When the acetal is butyraldehyde acetal, the polyvinyl acetal resin will preferably contain on a weight basis from 16 to 25 percent hydroxyl groups calculated as polyvinyl alcohol and from 0 to 10 percent acetate groups calculated as polyvinyl acetate, the balance being essentially butyraldehyde acetal. Polyvinyl acetal resins, particularly polyvinyl butyral, are well known in the art as efficient interlayers for laminated safety glass windshields. Therefore, further description of the polyvinyl acetal resins is not necessary, as those skilled in the art are well aware of these materials and their methods of preparation.

Conventionally, polyvinyl acetals, particularly polyvinyl butyral as used in safety-glass laminates, contain a plasticizer. Generally, the plasticizer used is a water-insoluble ester of a polybasic acid and a polyhydric alcohol. Particularly desirable plasticizers for use with polyvinyl butyral are triethylene glycol di(2-ethyl butyrate), dibutyl sebacate, di(beta-butoxy-ethyl) sebacate and dioctyl phthalate.

Many well-known plasticizers suitable for use with polyvinyl butyral are disclosed in U.S. Pat. No. 2,526,728 to Burk et al. The most commonly used are monocarboxylic aliphatic acid esters of ether glycols, such as triethylene glycol di-2 ethyl butyrate.

Generally, the plasticizers used are water-insoluble esters of a polybasic acid of a polyhydric alcohol. Particularly desirable plasticizers for use in the present invention are triethylene glycol di(2-ethyl-butyrate), dibutyl sebacate, di(beta-butoxy-ethyl) adipate, and dioctyl phthalate. Other suitable plasticizers include triethylene glycol fully esterified with a mixture of 80–90 percent caprylic acid and 10–20 percent capric acid as described in U.S. Pat. No. 2,372,522 to Strauss, dimethyl phthalate, dibutyl phthalate, di(butoxyethyl) sebacate, methyl palmitate, methoxyethyl palmitate, triethylene glycol dibutyrate, triethylene glycol diacetate, tricresyl phosphate, triethyl citrate, butyl butyryl lactate, ethyl para-toluene sulfonamide, dibutyl sulfone, lauryl alcohol, oleyl alcohol, glycerol triricinoleate, methyl lauroyl glycolate, butyl octanoyl glycolate and butyl laurate. The above list of plasticizers does not represent all the known plasticizers which can be used. Such a list would be impractical and would serve no purpose since one skilled in the art can readily select a plasticizer from the many already known.

The present invention will be understood better in the light of a description of an illustrative embodiment which follows. In the description, reference is made to the various drawings which form part of the description and in which like reference numbers are applied to like structural elements.

BRIEF DESCRIPTION OF THE DRAWINGS

FIG. 1 is a perspective view of an assembly of elements in position to be inserted within a laminating bag to form a plastic laminated windshield for aircraft, with certain parts of the assembly broken away to show the arrangement of other parts of the assembly more clearly;

FIG. 2 is a fragmentary, enlarged cross-sectional view of an alternate assembly of elements to be laminated to form a laminated canopy for aircraft taken along an edge of wedge means useful to practice this invention;

FIG. 3 is a further enlarged sectional view of said wedge means used with the assembly of FIG. 1 or FIG. 2 in accordance with the present invention taken along the lines 3—3 of FIG. 1;

FIG. 8 is an enlarged cross-sectional view of marginal frame means taken along the lines 8—8 of FIG. 1.

DESCRIPTION OF PREFERRED EMBODIMENT

Figure 4:
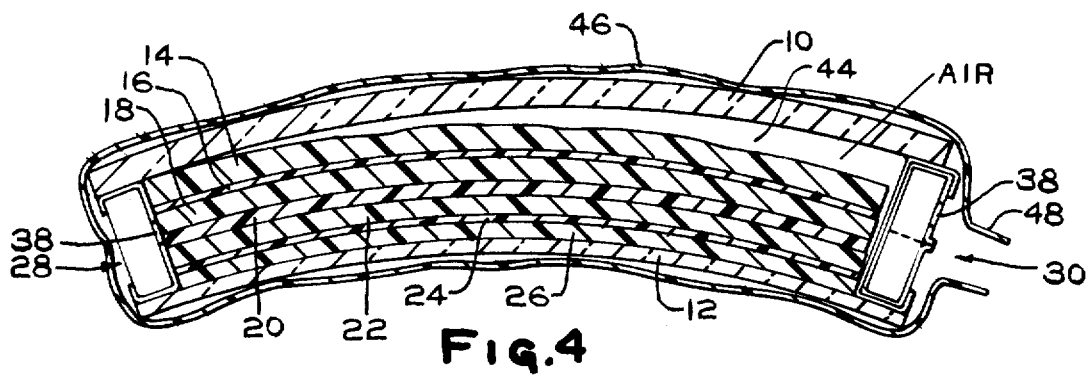
FIG. 4 is a cross-sectional view of an assembly of curved elements inserted within a flexible, evacuatable, laminating bag in the first step of a laminating operation.

Referring to the drawings, FIG. 1 shows an assembly of elements to be laminated and simultaneously press polished at its outer major surfaces to form a laminated aircraft transparency to be used as an aircraft windshield. The elements of the assembly are sandwiched between a pair of pressing plates 10 and 12, having smooth outer surfaces. Sheets of strengthened glass, preferably chemically tempered glass are used as the pressing plates. A typical tempered glass and its method of fabrication is described in U.S. Pat. No. 3,218,220 to Weber, the description of which is incorporated in this specification by reference.

The assembly to be laminated is assembled with an uppermost layer 14 of acrylic plastic such as polymethyl methacrylate, a second layer 16 of interlayer material such as polyurethane or polyvinyl butyral or ionomer or silicone, a third layer 18 of polycarbonate plastic, a fourth layer 20 of interlayer material, a fifth layer 22 of polycarbonate plastic, a sixth layer 24 of interlayer material and a seventh layer 26 of acrylic plastic.

The outlines of the layers 14, 16, 18, 20, 22, 24 and 26 are coextensive with one another. The pressing plates 10 and 12 are larger than the layers and are arranged in peripheral alignment with one another to provide a peripheral space between the pressing plates 10 and 12 that surrounds the aligned peripheral edges of the assembled layers 14 to 26.

Marginal frame means 28, whose height equals the total thickness of the layers 14 to 26 and whose width equals the overlap of the pressing plates 10 and 12 that extends beyond the marginal edge of the assembled layers 14 to 26, is inserted in the marginal space surrounding the layers, except for short lengths of the marginal space that are occupied by wedge means 30. Two or more wedge means 30 are located in spaced relation along one edge of the marginal space in case the assembly to be laminated is flat or bent to a relative simple curvature about a single axis of bending that extends generally parallel to the length of the edge of the marginal space that is occupied in part by the spaced wedge means 30. In case the assembly to be laminated is bent to a compound curvature, that is, a shape involving two bends about axes of bending that are angularly related to one another, wedge means 30 are provided along two adjacent edges of said marginal space surrounding the assembly of layers to be laminated. The wedge means 30 is of a compressible material softer than the relatively hard plastic layers.

The marginal frame means 28 may be a unitary member or may comprise a series of members that abut one another around the marginal space surrounding the assembly except for spaces needed to be occupied by the wedge means 30. Each marginal frame means 28 preferably comprises a rubber core member 32 enclosed in parting material comprising a porous channel 34 of fiber glass surrounded by a thin, flexible, channel-shaped, plastic cover 36 of polyvinyl fluoride (sold under the trademark TEDLAR). Both the channel 34 and the thin plastic cover 36 open outward away from their inner walls that abut the margin of the layers of the assembly. A number of slits 38 are cut in the wall of the cover 36 that faces the marginal edge of the assembly.

Each wedge means 30 of the preferred embodiment of this invention comprises a plurality of layers of interlayer material (preferably scraps remaining after cutting the interlayers to desired outline) mounted atop one another to form a block of interlayer material 40 enclosed within a sealed bag 42 of thin flexible laminated plastic, preferably of the type described in U.S. Pat. No. 3,255,567 to Leroy D. Keslar and John S. Rankin, the description of said laminating bag therefrom being incorporated herein by reference. Bag 42 is sealed at 43 and has slots 38 along its exterior wall. The parting material is between the sealed bag 42 and the perimeter of the assembly of layers 14 to 26.

As stated previously, the wedge means 30 is higher than the thickness of the assembly to be laminated. Since the marginal frame means 28 has approximately the same thickness as the assembly to be laminated, the pressing plate 10 rests directly on the upper surface of the marginal frame means 28 on the edge of the assembly in close adjacency to the upper surface of layer 14 and rests directly on the upper surface of the wedge means 30 along the opposite edge of the assembly in spaced relation to the upper surface of the layer 14 on the opposite side thereof. This arrangement develops a wedge-shaped space 44 between the lower surface of the upper pressing plate 10 and the upper major surface of the uppermost layer 14 of the assembly to be laminated.

The assembly so arranged is inserted in a flexible laminating bag 46 of the type described in the aforesaid patent to Leroy D. Keslar and John S. Rankin. To insure that the elements of the assembly, the marginal frame means 28, the wedge means 30 and the pressing plates 10 and 12 remain in proper alignment during their insertion into the flexible laminating bag 46, a few strips of adhesive tape (not shown) are applied in spaced relation about the margin of the assembly to temporarily adhere the pressing plates 10 and 12 to the outer surfaces of the marginal frame means 28 and of the wedges 30 prior to inserting the assembly of layers and pressing plates into the flexible laminating bag 46.

The assembly having an uneven outer surface is shown in FIG. 4 inserted within a flexible laminating bag 46 with entrapped air occupying the wedge shaped space 44. The bag 46 has an opening 48 that is adapted for attachment to a vacuum source (not shown). When the bag 46 is attached to a vacuum source, it is evacuated through the bag opening 48.

Figure 5:
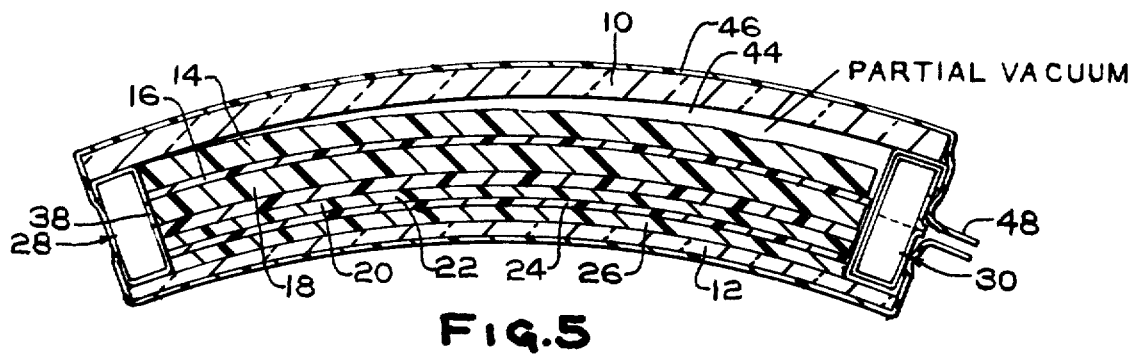
FIG. 5 is a view similar to that of FIG. 4 showing the assembly inserted within the flexible laminating bag during an evacuation of said flexible laminating bag.

FIG. 5 shows the assembly and pressing plates 10 and 12 within the flexible evacuating bag 46 while the bag 46 is being evacuated. At this time, the wedge-shaped space 44 is a partial vacuum.

Figure 6:
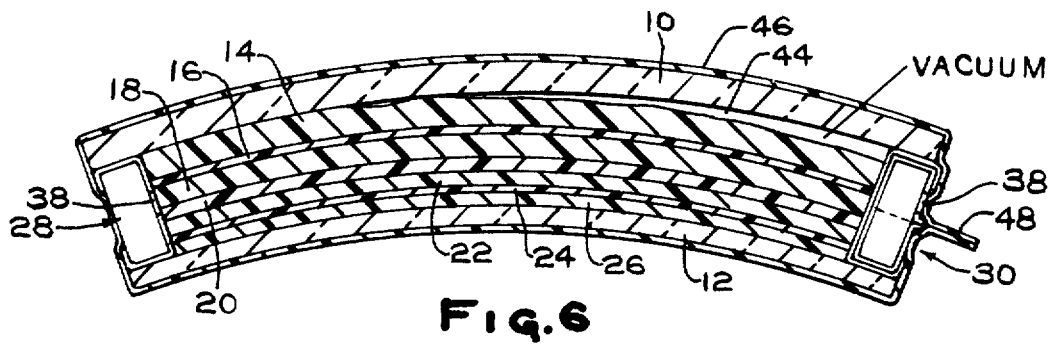
FIG. 6 is a view similar to FIGS. 4 and 5, showing the assembly within the flexible laminating bag after completing the evacuation step and prior to laminating said assembly under heat and pressure.

In FIG. 6, evacuation has been completed and the bag opening 48 has been sealed. The wedge-shaped space 44 is now a vacuum. The bag 46 containing the assembly and the evacuated wedge-shaped space 44 is now ready for lamination. The sealed, evacuated bag 46 and its contents are then immersed in an autoclave for lamination.

A typical laminating cycle is to pressurize at 200 pounds per square inch (13.6 atmospheres) and start heating to 300° F. (149° C.) shortly after applying pressure, hold the pressure and temperature for one hour, cool to 100° F. (38° C.) in 55 minutes at the elevated pressure and relieving the pressure. Other combinations of time, temperature and pressure may be used depending upon the thickness, the curvature and the composition of the layers comprising the assembly to be laminated. The preferred laminating cycle recited is for laminating an aircraft laminated windshield having windshield layers of the following thicknesses:

polymethyl methacrylate layer—187 mils (4.8 mm)
polyurethane layer—30 mils (0.8 mm)
polycarbonate layer—125 mils (3.2 mm)
polyurethane layer—90 mils (2.4 mm)
polycarbonate layer—125 mils (3.2 mm)
polyurethane layer—30 mils (0.8 mm)
polymethyl methacrylate layer—80 mils (2.0 mm)

In the laminating operation just described, the pressing plates 10 and 12 are glass sheets that are chemically tempered by ion exchange, the marginal frame means 28 comprises a rubber core member 667 mils (16.9 mm) high and 300 mils (7.6 mm) wide enclosed in a compressible fiber glass channel member approximately 10 mils (0.3 mm) thick in the uncompressed state and a channel-shaped polyvinyl fluoride cover 1 mil (0.03 mm) thick. The wedge means 30 is composed of 26 thicknesses of polyurethane interlayer strips each 30 mils (0.8 mm) thick within a plastic evacuating bag 5 mils (0.01 mm) thick to provide a total thickness of 790 mils (20.1 mm). The wedge-shaped space 44 has virtually no thickness at one side of the assembly and is approximately 123 mils (3.1 mm) thick at the opposite side.

The wedge means 30 support the wedge-shaped space 44 during the steps of inserting the assembly and the pressing plates within the flexible laminating bag 46 and during the evacuation step. However, since the wedge means 30 are composed of the same material as the interlayers 16, 20 and 24, when the assembly is subjected to the elevated temperature and pressure conditions of the autoclave, the pressing plates 10 and 12 compress the wedge means 30 until the latter are distorted to a thickness approximating the total thickness of the assembly to be laminated. The marginal frame means 28 remains undistorted during lamination because its thickness approximates the thickness of the assembly. The pressing plates 10 and 12 press polish the outer surfaces of the assembly as they press the layers together to effect lamination.

Figure 7:
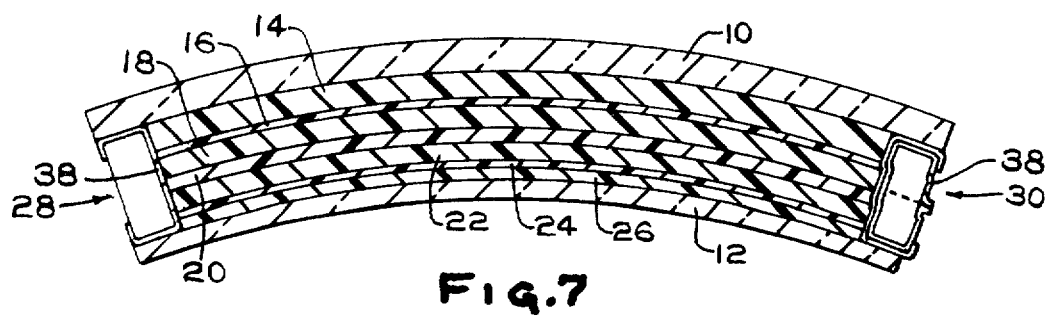
FIG. 7 is a view of the assembly after it has been laminated and removed from within said flexible laminating bag.

When the autoclave cycle is completed, the laminating bag is cut open and the assembly and pressing plates 10 and 12 removed. FIG. 7 shows how the wedge means 30 is distorted and how the assembly and pressing plates appear immediately after removal from the flexible laminating bag 46 with the smooth surfaces of the pressing plates impressed onto the outer major surfaces of the laminated assembly.

The pressing plates 10 and 12, the marginal frame 28 and the wedge means 30 are separated from the laminated assembly. This separation provides a smoothly surfaced, laminated transparency, which is ready for further fabricating steps, such as drilling apertures through the thickness of its marginal portion and routing the marginal edge portion to conform its shape to that of a mounting frame so that the laminated transparency can be further fabricated into a finished product, such as a windshield or a canopy, for example, ready to be installed in an aircraft frame.

The cross-sectional view of FIG. 2 differs from those of FIGS. 1 and 4 to 7 in that layers 22 and 24 are omitted from FIG. 2 and the relative thickness of the layers of the FIG. 2 differs from that of the embodiment disclosed in FIGS. 1 and 4 to 7. The laminated transparency that results from the lamination of the assembly depicted in FIG. 2 is suitable for use as a laminated canopy for aircraft and is provided with a compound bend that necessitates the use of spaced wedge means along two adjacent marginal edges of the assembly prior to inserting the assembly and pressing plates in a flexible laminating bag.

The evacuation of the wedge-shaped space 44 in either embodiment prior to sealing the bag 46 enables the pressing plates 10 and 12 to smooth any irregularities that may be present in the major outboard surfaces of the assembly at the same time as the assembly and the pressing plates 10 and 12 within a sealed, evacuated bag 46 are being subjected to the high temperature and pressure conditions of the autoclave. Evacuation and sealing prior to pressing in the autoclave removes air from the wedge-shaped space 44 and avoids the presence of air pockets at the major outboard surfaces or at any interfacial surfaces of the assembly of layers that is fabricated into a laminated transparency after lamination.

The form of the invention shown and described in this disclosure represents an illustrative preferred embodiment thereof that is suitable for use in removing entrapped air and other vapor from within the flexible laminating bag regardless of whether the assembly to be laminated comprises flat layers or layers shaped to a simple curvature about a single axis of curvature or a compound curvature about two or more axes of curvature. It is understood that various changes may be made without departing from the gist of the invention as defined in the claimed subject matter that follows.

We claim:

1. A method of fabricating a laminated transparency having smooth outer major surfaces and provided with a minimum of entrapped fluid bubbles comprising assembling alternate layers of a relatively hard plastic selected from the group of hard transparent plastic materials consisting of acrylic plastics, polycarbonates, polyesters, and hard polyurethanes and of a relatively soft interlayer material selected from the group consisting of polyurethanes, silicones, ionomers, and plasticized polyvinyl acetals to form an assembly to be laminated and simultaneously press polished, enclosing the outer major surfaces of said assembly between a pair of pressing plates having a greater extent than the outline of said layers in such a manner that the pressing plates extend beyond the margins of said layers to form a marginal space, applying marginal frame means having a thickness approximating the total thickness of said layers between the extending portions of said pressing plates along at least two adjacent sides of said marginal space and between the extending portions of said pressing plates along at least a portion of the length of at least one of the remaining sides of said marginal space, applying between at least a portion of the remainder of said extending portions of said pressing plates along at least one of said remaining sides of said marginal space, wedge means having a thickness greater than the total thickness of said layers and composed of material softer than said relatively hard plastic to form a wedge-shaped space between one of said pressing plates and an outer major surface of one of said layers of said assembly that faces said one of said pressing plates, inserting said assembly of said layers so arranged between said pressing plates within a thin, flexible laminating bag with said marginal frame means and said wedge means therearound, evacuating said laminating bag, sealing said evacuated laminating bag, and exposing said sealed, evacuated laminating bag to an elevated pressure and temperature for sufficient time for the pressing plates to press polish the outer major surfaces of said assembly, to distort the wedge means until the thickness thereof approximates the total thickness of said assembly and to laminate the layers of said assembly.

2. The method as in claim 1, further including opening said bag, removing said pressing plates, said marginal frame means, said wedge means, and said assembly from said bag, and separating said pressing plates, said marginal frame means and said wedge means from said assembly.

3. The method as in claim 1, further including the step of applying parting material about the perimeter of said assembly before applying said marginal frame and said wedge means to the marginal space surrounding said assembly of layers.

4. The method as in claim 1, wherein said outer major surfaces of said assembly have one or more surface irregularities that require press polishing to reduce said irregularities.

5. The method as in claim 1, wherein said layers of relatively hard plastic are shaped to conforming curvatures prior to their assembly and said pressing plates are also shaped to conforming curvatures prior to enclosing said assembly between said pair of shaped pressing plates.

6. The method as in claim 5, said layers of said assembly to be laminated being shaped to conforming simple curvatures about a single axis, and said pressing plates being shaped to similar simple curvatures, comprising applying said wedge means to said marginal space along one marginal edge only of said assembly and applying said marginal frame means to the remainder of said marginal space.

7. The method as in claim 5, said layers of said assembly to be laminated being shaped to conforming complex curvatures about two axes, and said pressing plates being shaped to similar complex curvatures, comprising applying said wedge means to said marginal space along a pair of adjacent marginal edges of said assembly and applying said marginal frame means to the remainder of said marginal space.

8. Apparatus for fabricating a laminated transparency having smooth outer major surfaces and provided with a minimum of entrapped fluid bubbles from an assembly comprising alternate layers of a relatively hard plastic selected from the group of hard transparent plastic materials consisting of acrylic plastics, polycarbonates, polyesters, and hard polyurethanes and of a relatively soft interlayer material selected from the group consisting of polyurethanes, silicones, ionomers and plasticized polyvinyl acetals, wherein the outer major surface of said assembly has one or more surface irregularities that require press polishing to reduce said irregularities, said apparatus comprising a pair of pressing plates having a greater extent than said layers and arranged to extend beyond the margins of said layers to form a marginal space, wedge means having a thickness greater than the total thickness of said layers to be laminated and having a hardness less than that of said relatively hard plastic disposed along at least one marginal edge of said assembly in said marginal space, marginal frame means disposed along the remainder of said marginal edge of said assembly in said marginal space, a flexible laminating bag encompassing said pressing plates, said assembly to be laminated, said wedge means and said marginal frame means, means to evacuate said bag, means to seal said bag when the latter is evacuated, and means to impart elevated temperature and pressure to said sealed, evacuated bag when the latter encompasses said assembly, whereby said layers are laminated to one another and said major surface of said assembly is smoothed to form a laminated transparency having acceptable surface smoothness.

9. Apparatus as in claim 8, said layers of relatively hard plastic being shaped to conforming simple curvatures about a single axis, said wedge means being located along one marginal edge of said assembly in said marginal space.

10. Apparatus as in claim 8, said layers of relatively hard plastic being shaped to conform to complex curvatures about two axes, said wedge means being located along a pair of adjacent marginal edges of said assembly in said marginal space.

* * * * *